US008873049B2

(12) United States Patent
Rolland et al.

(10) Patent No.: US 8,873,049 B2
(45) Date of Patent: Oct. 28, 2014

(54) BROAD BAND CZERNY-TURNER SPECTROMETER, METHODS, AND APPLICATIONS

(75) Inventors: Jannick P. Rolland, Pittsford, NY (US); Kevin P. Thompson, Pittsford, NY (US); Kye-Sung Lee, Rochester, NY (US)

(73) Assignee: University of Rochester, Rochester, NY (US)

( * ) Notice: Subject to any disclaimer, the term of this patent is extended or adjusted under 35 U.S.C. 154(b) by 5 days.

(21) Appl. No.: 13/695,298

(22) PCT Filed: Apr. 29, 2011

(86) PCT No.: PCT/US2011/034506
§ 371 (c)(1),
(2), (4) Date: Oct. 30, 2012

(87) PCT Pub. No.: WO2011/137316
PCT Pub. Date: Nov. 3, 2011

(65) Prior Publication Data
US 2013/0044313 A1    Feb. 21, 2013

Related U.S. Application Data

(60) Provisional application No. 61/329,661, filed on Apr. 30, 2010.

(51) Int. Cl.
*G01J 3/28*    (2006.01)
(52) U.S. Cl.
USPC ........................................................ 356/328
(58) Field of Classification Search
USPC ......................................... 356/326, 328, 334
See application file for complete search history.

(56) References Cited

U.S. PATENT DOCUMENTS

| 4,983,039 | A | * | 1/1991 | Harada et al. | 356/328 |
| 5,045,695 | A | * | 9/1991 | Rule et al. | 250/305 |

(Continued)

FOREIGN PATENT DOCUMENTS

| JP | 57054824 | 4/1982 |
| JP | 04335122 | 11/1992 |

OTHER PUBLICATIONS

Bates, B. et al., Correction of astigmatism in a Czery-Turner Spectorgraph using a plane grating in divergent illumination, Journal of Physics E: Scientific Instruments 1970, vol. 3, pp. 206-210.

(Continued)

*Primary Examiner* — Abdullahi Nur
(74) *Attorney, Agent, or Firm* — William Greener; Bond, Schoeneck & King, PLLC

(57) ABSTRACT

A low-cost optics, broadband, astigmatism-corrected practical spectrometer. An off-the-shelf cylindrical lens is used to remove astigmatism over the full bandwidth, providing better than 0.1 nm spectral resolution and more than 50% throughput over a bandwidth of 400 nm centered at 800 nm. The spectrometer includes a first spherical mirror disposed along an optical path in an off-axis (tilted) orientation; a diffraction grating disposed along the optical axis in a location optically downstream from the first mirror; a second spherical mirror disposed along the optical path in an off-axis orientation in a location optically downstream from the diffraction grating; a cylindrical optic disposed in the optical path; and a detector disposed in the optical path in a location optically downstream from the second spherical mirror.

13 Claims, 9 Drawing Sheets

(56) References Cited

U.S. PATENT DOCUMENTS

| | | | |
|---|---|---|---|
| 5,767,966 A | 6/1998 | Iwasaki | |
| 7,102,746 B2 * | 9/2006 | Zhao | 356/301 |
| 7,812,949 B2 * | 10/2010 | Delmas et al. | 356/326 |
| 2009/0103088 A1 | 4/2009 | Delmas et al. | |

OTHER PUBLICATIONS

PCT International Search Report and Written Opinion, KIPO, Jan. 11, 2012.

* cited by examiner

BROAD BAND CZERNY-TURNER SPECTROMETER, METHODS, AND APPLICATIONS

REFERENCE TO RELATED APPLICATIONS

This application claims priority to U.S. Provisional Application No. 61/329,661, filed Apr. 30, 2010, the subject matter of which is hereby incorporated by reference in its entirety.

US GOVERNMENT SPONSORSHIP

The invention was made with government support under Grant No. 5R01EY014999 from the National Institutes of Health/National Eye Institute. The government has rights in the invention.

FIELD OF THE INVENTION

The present invention relates generally to the field of optical spectrometry and, more particularly, to a broad-band, astigmatism-corrected, Czerny-Turner Spectrometer, methods associated therewith, and applications thereof.

BACKGROUND

Two-beam spectral interferometry (SI) has enabled the rapid development of such techniques as spectrometer-based frequency-domain optical coherence tomography (FD-OCT) and femtosecond pulse characterization. The Czerny-Turner spectrometer is a commonly used instrument in SI because, by definition, only two spherical mirrors and a plane grating can be configured in a coma-free geometry where, together with a low numerical aperture, spherical aberration can be avoided (see FIG. 1 illustrating known Czerny-Turner Spectrometer. However, such an optical design and layout does not provide resolution better than 0.1 nm, which is advantageous and typically necessary in the application of FD-OCT to obtain 1 mm imaging depth in skin, for example, with sub-micron axial resolution.

Czerny and Turner first showed that the coma aberration introduced by the off-axis reflection from a spherical mirror can be corrected by a symmetrical, but oppositely oriented, spherical mirror for spectrometer design. After that, Shafer showed that the coma aberration could be corrected in the Czerny-Turner spectrometer, even though its symmetry is broken, if the geometry parameters satisfy a condition that is known as the Shafer equation (see A. B. Shafer, L. R. Megill, and L. Droppleman, "Optimization of the Czerny-Turner spectrometer," J. Opt. Soc. Am. 54 879-887 (1964); Q. Xue, S. Wang, and F. Lu, "Aberration-corrected Czerny-Turner imaging spectrometer with a wide spectral region," Appl. Opt. 48, 11-16 (2009)). However, astigmatism remains in both configurations yielding different focal lengths in the tangential and sagittal planes. The astigmatism can be ignored in one-dimensional (1-D) spectroscopy by locating an exit slit at the tangential focal plane. However, some applications sensitive to power efficiency, such as high speed spectrometer-based FD-OCT, for example, required collecting the most power with high speed line CCD or CMOS cameras where the width of the detector area is limited to maximize signal to noise ratio. In those applications, the uncorrected astigmatism results in degraded performance. Reported methods to reduce or remove the limiting astigmatism include: using additional convex mirrors; placing compensating optics before the entrance slit; using toroidal mirrors; using a cylindrical grating; or introducing divergent illumination. Some techniques were pursued with a goal of providing extended spectral range. However, these methods need to satisfy a condition of the parameters of the Czerny-Turner spectrometer to compensate the astigmatism of the spectrometer, which may limit the spectrometer design for various specifications.

In view of the foregoing problems and shortcomings discussed above, the inventors have recognized the benefits and advantages of a solution thereto. The inventive solution proposes a modified Czerny-Turner geometry using only off-the-shelf, low-cost optical components without requiring the aforementioned restrictive condition.

SUMMARY OF THE INVENTION

An embodiment of the invention is a Czerny-Turner-type spectrometer. The spectrometer includes a first spherical mirror disposed along an optical path in an off-axis (tilted) orientation; a diffraction grating disposed along the optical axis in a location optically downstream from the first mirror; a second spherical mirror disposed along the optical path in an off-axis orientation in a location optically downstream from the diffraction grating; a cylindrical optic disposed in the optical path; and a detector disposed in the optical path in a location optically downstream from the second spherical mirror. In various non-limiting aspects:
the cylindrical optic is a lens;
the cylindrical optic is disposed in a location optically downstream from the second spherical mirror;
the cylindrical optic is in an off-axis (tilted) orientation;
the cylindrical optic is disposed in a location between the first spherical mirror and the diffraction grating;
the diffraction grating is a plane grating;
the spectrometer has a spectral resolving power characterized by a spectral resolution of equal to or less than 0.1 nanometer (nm) over a spectral region from about 600 nm to about 1000 nm; the spectrometer has a spectral throughput characterized by the spectral resolution of equal to or greater than 50% over the spectral region.

An embodiment of the invention is a Czerny-Turner component of a Czerny-Turner-type spectrometer. The Czerny-Turner component need include only a first spherical mirror disposed along an optical path in an off-axis orientation; a diffraction grating disposed along the optical axis in a location optically downstream from the first mirror; a second spherical mirror disposed along the optical path in an off-axis orientation in a location optically downstream from the diffraction grating; a cylindrical optic disposed in the optical path; and a detector disposed in the optical path in a location optically downstream from the second spherical mirror. In various non-limiting aspects:
the component further includes a detector disposed in the optical path in a location optically downstream from the second spherical mirror;
   the cylindrical optic is a lens;
   the cylindrical optic is disposed in a location optically downstream from the second spherical mirror.

The embodied spectrometer and components thereof provide two additional freedoms in design over a conventional Czerny-Turner spectrometer: the tilt angle of the cylindrical lens and the distance between a spherical mirror and the cylindrical lens. These freedoms enable optimization of the spectrometer performance using off-the-shelf optics, rather than requiring a custom, and costly, toroidal mirror or cylindrical grating.

DETAILED DESCRIPTION OF EXEMPLARY EMBODIMENTS

Figure 1:
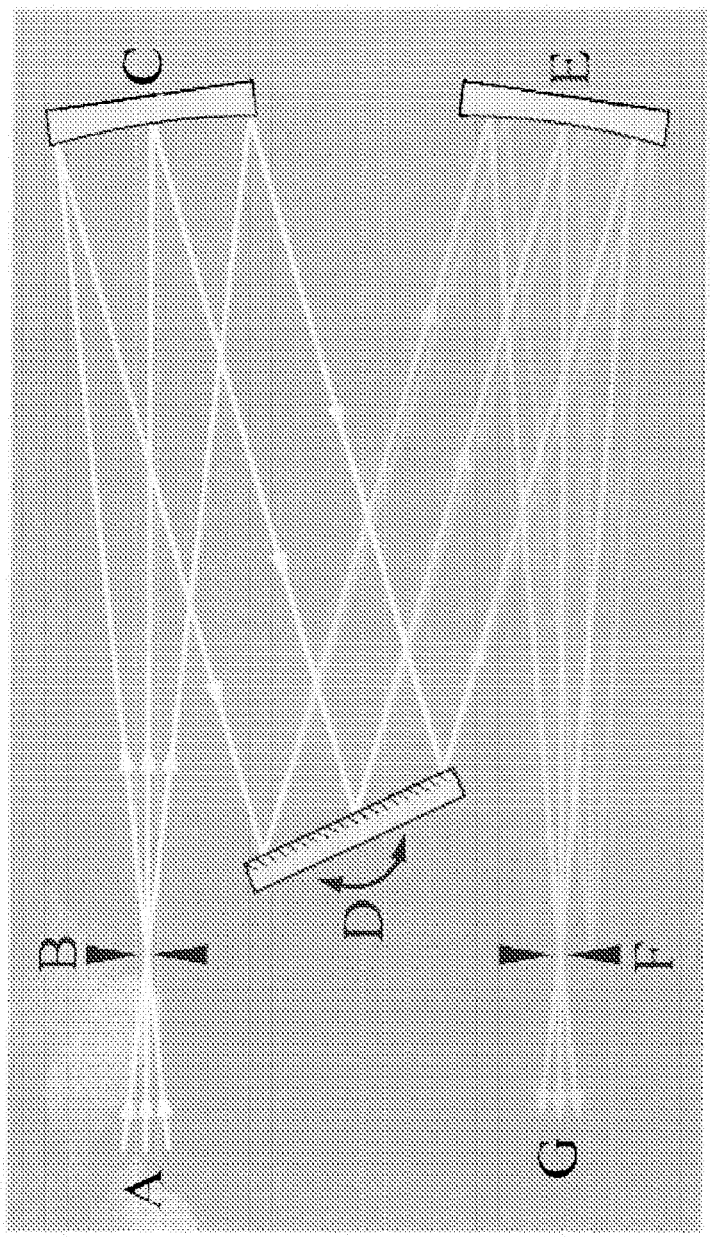
FIG. 1 schematically shows a Czerny-Turner monochrometer as known in the art.
Figure 2:
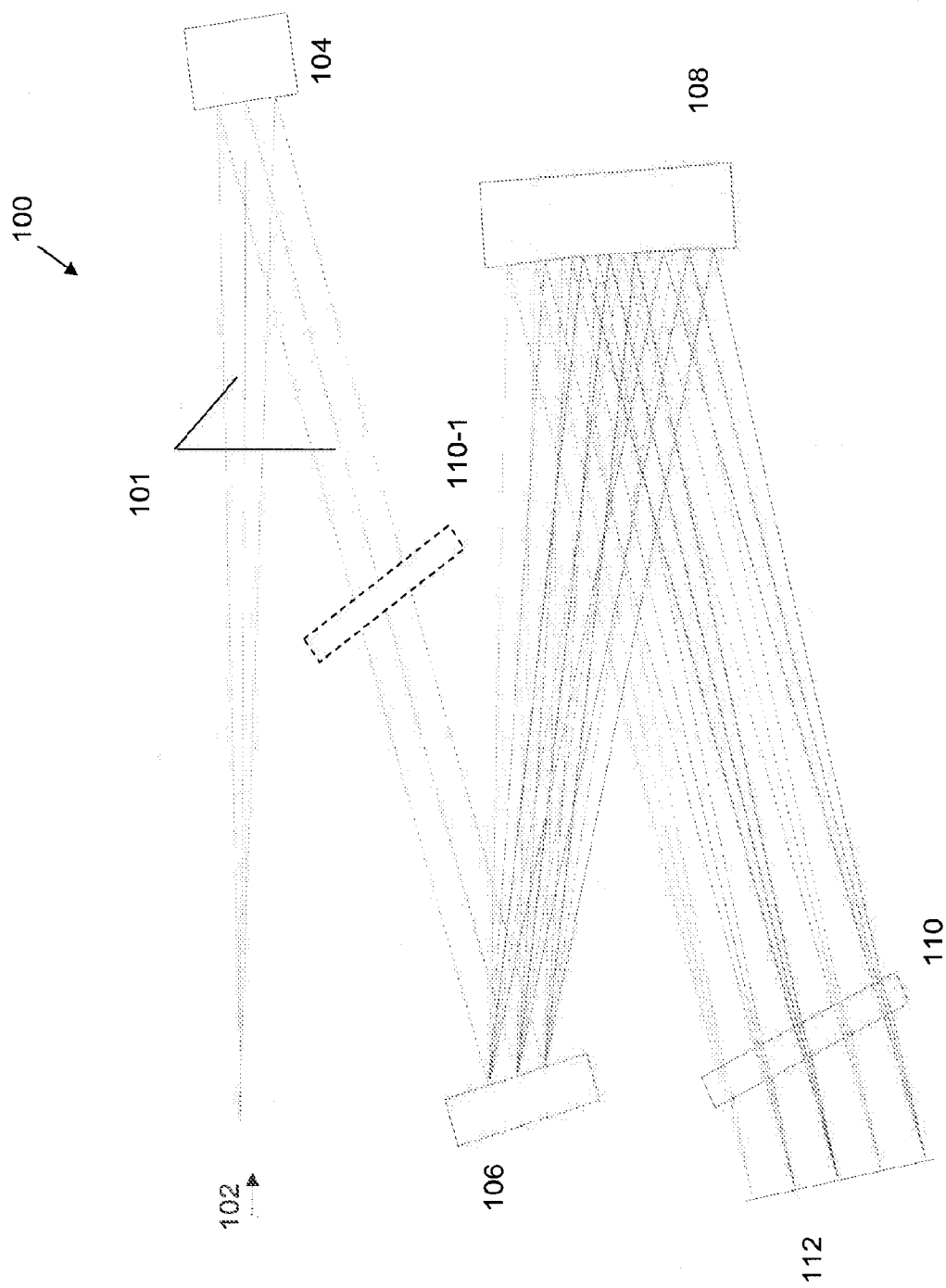
FIG. 2 schematically shows a Czerny-Turner component of a Czerny-Turner-type spectrometer, according to an exemplary embodiment of the invention.
Figure 3:
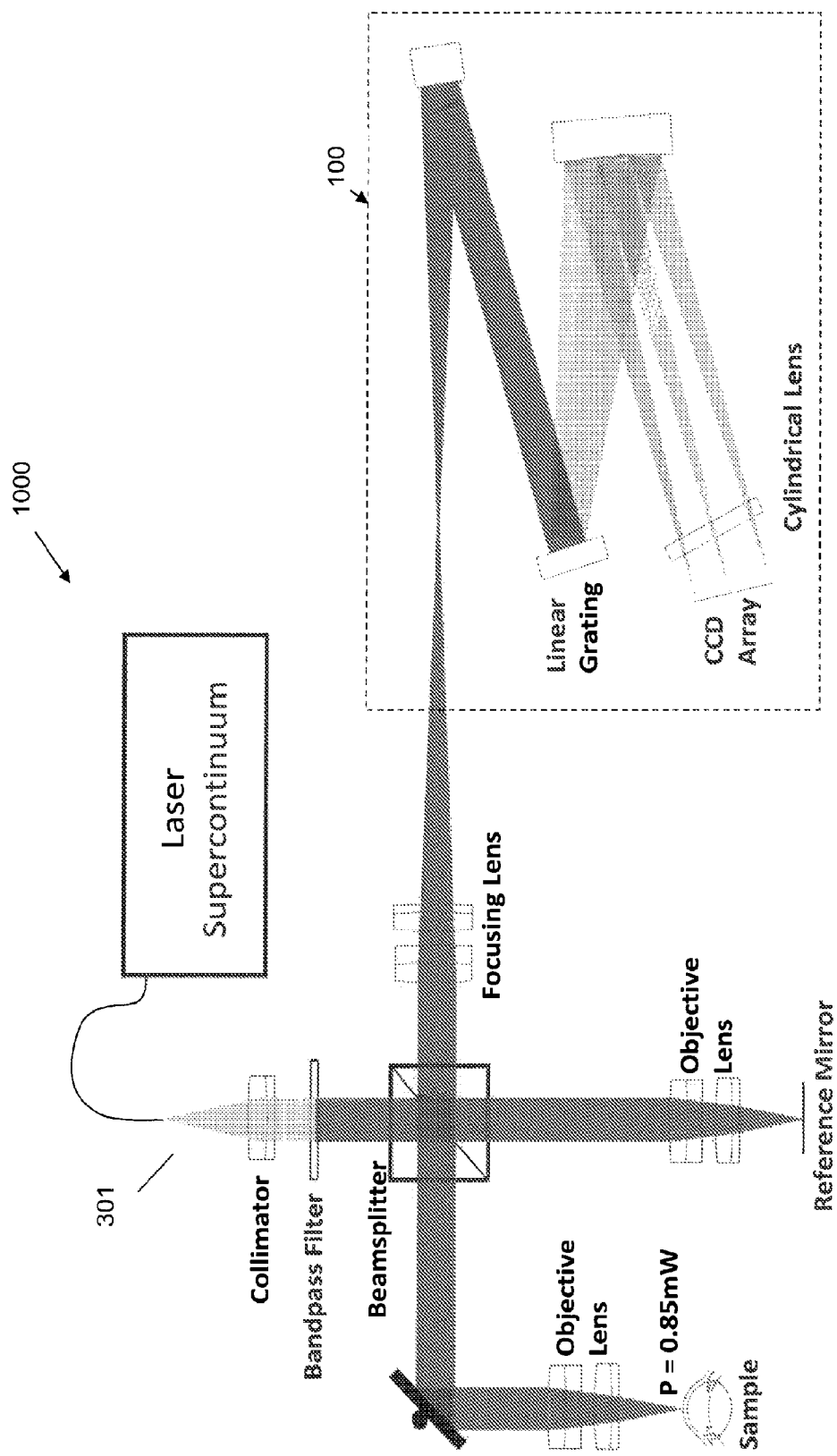
FIG. 3 schematically shows a Czerny-Turner-type spectrometer incorporating a Czerny-Turner component according to an exemplary embodiment of the invention.

An exemplary embodiment of the present invention is a Czerny-Turner component 100 of a Czerny-Turner-type spectrometer 1000, as illustrated in non-limiting layouts in FIGS. 2 and 3. With further reference to FIGS. 2 and 3, a Czerny-Turner component 100 of a Czerny-Turner-type spectrometer 1000, described in greater detail below, consists only of a first spherical mirror 104 disposed along an optical path (axis) 101 in an off-axis (tilted) orientation; a diffraction grating 106 disposed along the optical axis 101 in a location optically downstream from the first mirror; a second spherical mirror 108 disposed along the optical path in an off-axis (tilted) orientation in a location optically downstream from the diffraction grating; and a cylindrical optic 110 disposed in the optical path. As shown in FIG. 2, the cylindrical optic 110 is disposed along the optical axis in a location optically downstream from the second mirror 108. In an alternative aspect of the invention, the cylindrical optic denoted in dotted profile by 110-1 may be disposed along the optical axis in a location between the first spherical mirror and the diffraction grating. In addition, the Czerny-Turner component 100 includes a detector 112 disposed in the optical path in a location optically downstream from the second spherical mirror.

FIG. 3 schematically shows an exemplary broadband Czerny-Turner-type spectrometer 1000. The spectrometer as illustrated, described in greater detail below, includes a broadband light source with an optical fiber delivery path that propagates the light to a collimator and through a band pass filter. The light is then split by a beamsplitter, a portion of the light being reflected and focused onto a target sample, and a portion passing through the beamsplitter to a reference mirror from which it is reflected. All light is then focused and input to the Czerny-Turner component 100, which includes only a first spherical mirror, a diffraction grating, a second spherical mirror, a cylindrical optic, and an array detector such as a CCD or CMOS.

Figure 4:
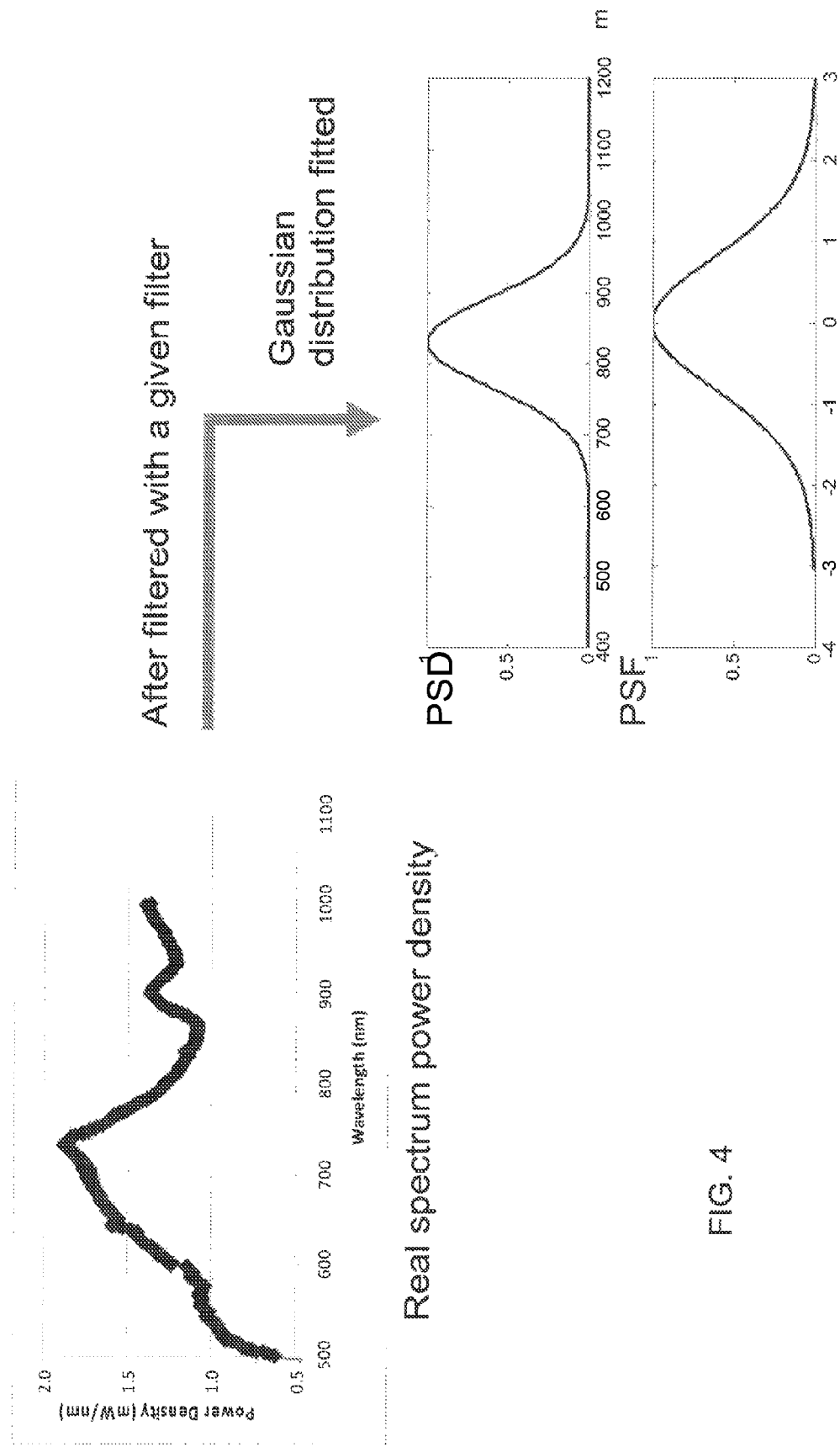
FIG. 4 shows graphs illustrating the unfiltered and filtered power density parameters of the light source, according to an illustrative aspect of the invention.

In the illustrated exemplary embodiment of FIG. 3, a supercontinuum source (SuperK versa, Koberas Inc.) spanning 600 nm to 1000 nm that is a region of interest in FD-OCT was used as the broadband light source. This provided a bandwidth from 620 nm-980 nm with a peak of 0.2 mW/nm after being filtered with a given filter (Koheras Inc.) as shown in FIG. 4. The light was delivered to the entrance 301 of the spectrometer 1000 using a photonic crystal single mode fiber (PCF). A pinhole can also be used in free space applications as one skilled in the art would understand. The numerical aperture (NA, half width at $1/e^2$) of the selected fiber depended on wavelength as 0.032 at 600 nm, 0.037 at 700 nm, 0.042 at 800 nm, 0.047 at 900 nm, and 0.052 at 1000 nm. The goal for spectral resolution (SR) was set to 0.1 nm, as the exemplary, non-limiting application of FD-OCT guiding our design corresponded to ~1 mm imaging depth in skin (refractive index ~1.4). The basic parameters of the detector were then set. The number of pixels was chosen to be 8000, which was the next available off-the-shelf number and more than the minimum number of pixels, 4000, calculated from the bandwidth $\Delta\lambda$ (i.e., 400 nm) and the spectral resolution 0.1 nm (i.e., 400 nm/0.1 nm). The length of the detector was 80 mm with a pixel size of 10 μm. The diverging beams with different numerical apertures from the PCF were collimated by the first spherical mirror to a reflective diffraction grating. The F/# of the first spherical mirror was determined with the NA of the incident light. The F/# was calculated to be 11.9 at the central wavelength. The focal length $f_1$ of the first spherical mirror was chosen as an off-the-shelf value of 200 mm. The collimated beam size $\Phi$ was calculated to be 16.8 mm by $\Phi = f_1/(F/\#)$. The NA at the image plane ($NA_i$) was calculated from the pixel size of the detector using diffraction-limit theory to yield 0.05 at 800 nm. The focal length $f_2$ of the second mirror was estimated at 175 mm using the beam size $\Phi$ and $NA_i$. The $f_2$ was chosen to be an off-the-shelf value of 150 mm, near the estimated value. The collimated beam from the first spherical mirror was dispersed spectrally on the grating surface. The angular spread $\Delta\theta$ was derived using the grating equation, which is given by $$\Delta\theta = (d\theta/d\lambda)|_{\lambda=\lambda_{bar}} \Delta\lambda = (\Delta\lambda/d \cos\theta_{bar}). \quad (1)$$

Figure 5:
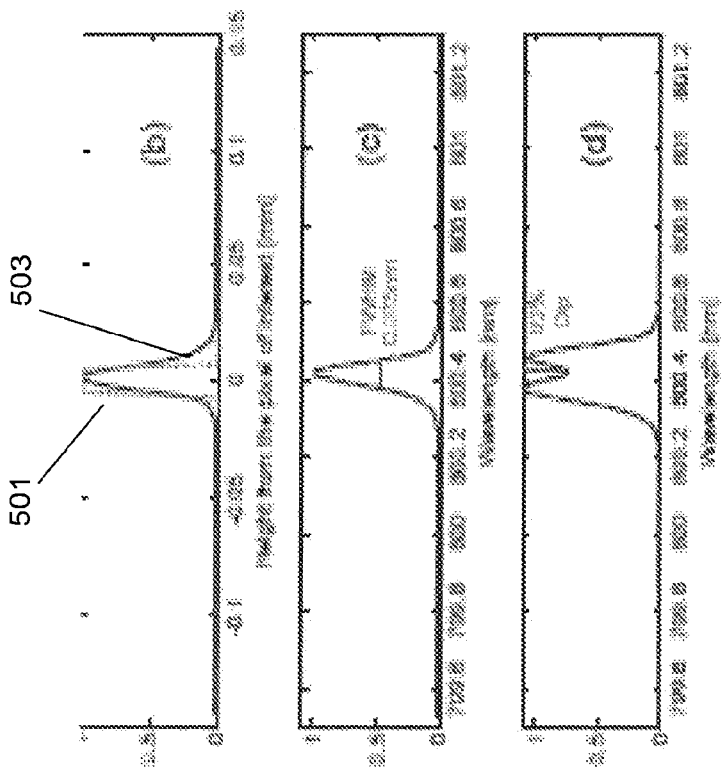
FIG. 5(a) schematically shows the optimized layout of a broadband astigmatism-corrected Czerny-Turner spectrometer to an exemplary embodiment of the invention; (b) The pixel function and the LSF; (c) the convolution over the pixel; and (d) the 80% dip in the separation of the two convolutions, according to an illustrative aspect of the invention.
Figure 5:
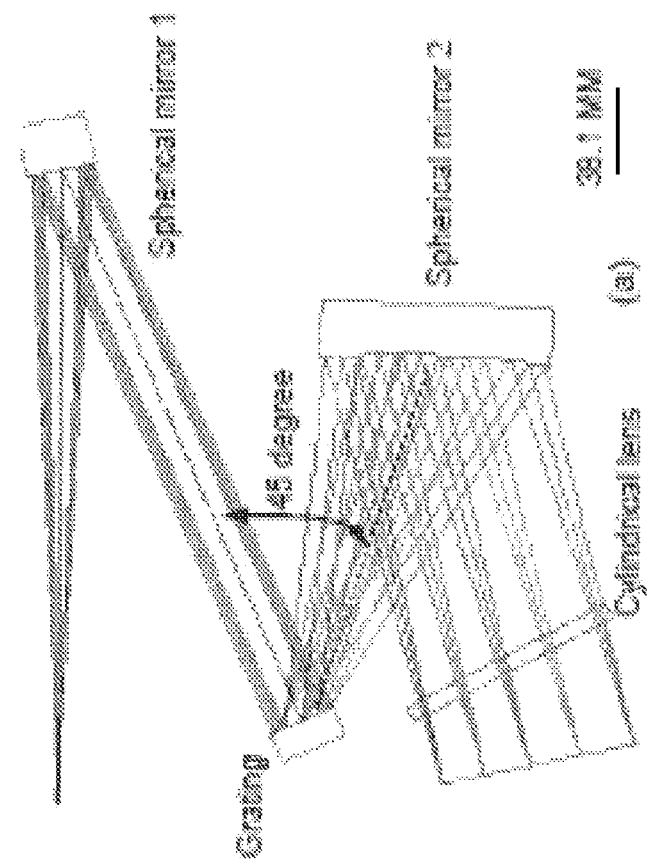

The groove spacing d was calculated using the relation of detector length L, the focal length $f_2$, and the angular spread $\Delta\theta$ of the full bandwidth 400 nm.

$$d = (\Delta\lambda/\cos\theta_{bar})(f_2/L), \quad (2)$$

where $\theta_{bar}$ was set to 45° to secure sufficient free spectral range as shown in FIG. 5. d was calculated to be 1.1 μm. We selected an off-the-shelf value of 1.2 μm, which corresponded to 833 lines/mm. The resolving power of the grating was checked to satisfy the condition $(\Phi/d) \geq (\lambda_0/SR)$; if it was not, $\Phi$ would be increased by adjusting the focal length of the first mirror. The tilt of the first mirror, $\alpha_1$, was selected to be near the smallest angle (chosen as 12°) to avoid obscuration of the rays by the secondary mirror. The sagittal focal length of the cylindrical lens was chosen to secure some margin between the detector and the cylindrical lens. We chose an off-the-shelf cylindrical lens with $f_{cs}$ equal to 100 mm. n equal 1.5, and t equal to 5.2 mm. We optimized the system parameters using the ray-tracing software CODE V to get the best balance of coma. The initial and final parameters are shown in Table. 1. The fixed parameters are shown in Table 2. These values correspond to off-the-shelf components.

TABLE 1

Initial and optimized parameters

| Variable Parameters | $\alpha_1$ (°)† | $\bar{\alpha}_2$ (°) | f (°)† | $\bar{\theta}$ (°) | $L_{GF}$ (mm) | $L_c$ (mm) | δ (°) | L (mm) |
|---|---|---|---|---|---|---|---|---|
| Initial | 12 | 0 | 0 | 45 | 150 | 100 | 0 | 80 |
| Final | 12 | 17.3 | 0 | 41.8 | 129.3 | 102.5 | 9.1 | 68.2 |

†Selected to avoid interference between optics and rays.

TABLE 2

Fixed parameters

| Fixed parameters | $R_1$ (mm) | $R_2$ (mm) | d (μm) | $f_{cs}$ (mm) | $t_g$ (mm) |
|---|---|---|---|---|---|
| Values | 400 | 300 | 1.2 | 100 | 5.2 |

Before optimization with the cylinder lens, the astigmatism Δz at 800 nm was calculated to be 21.5 mm using Eq. (3), where $\alpha_1$ and $\alpha_{2bar}$ are given in Table 1. The position $L_c$ of the cylindrical lens was calculated to be 100.7 mm using Eq. (8) and (9), which is in close agreement with the optimized value 102.5 mm. The tilt angle δ of the cylindrical lens was calculated to be 6.4° from Eq. (11) and (16), which is close to the optimized value 9.1°. The optimized layout is shown in FIG. 5(a).

The difference in astigmatic foci generated by the two off-axis spherical mirrors of a Czerny-Turner can be written as $$\Delta_z = (R_1/2)(\sin \alpha_1 \tan \alpha_1) + (R_2/2)(\sin \alpha_2 \tan \alpha_2), \quad (3)$$

where $R_1$ is the radius of the first spherical mirror, $R_2$ is the radius of the second spherical mirror, $\alpha_1$ is the off-axis incident angle on the first mirror, and $\alpha_2$ is the off-axis incident angle on the second mirror. In the illustrated design of FIG. 2, the cylindrical lens 110 is located adjacent the detector that displays both in (a) the tangential view and in (b) the sagittal view. The change of the sagittal focus $s_{cs}$–$s'_{cs}$ illustrated in FIG. 6(b) is calculated by the sagittal lens equation of the cylindrical lens $s'^{-1}_{cs} = f^{-1}_{cs} + s^{-1}_{cs}$, which yields $$s_{cs} - s'_{cs} = s_{cs} - [f_{cs} s_{cs}/(f_{cs} + s_{cs})], \quad (4)$$

where the subscript c stands for cylindrical, $s_{cs}$ is the sagittal object distance, $s'_{cs}$ is the sagittal image distance, and $f_{cs}$ is the sagittal focal length of the cylindrical lens. The change of the tangential focus introduced by the cylindrical lens (i.e., plane parallel plates in the tangential view) is given simply by $$s'_{ct} - s_{ct} = [(n-1)/n] t_0, \quad (5)$$

where n is the refractive index and $t_0$ is the central thickness of the cylindrical lens.

Figure 6:
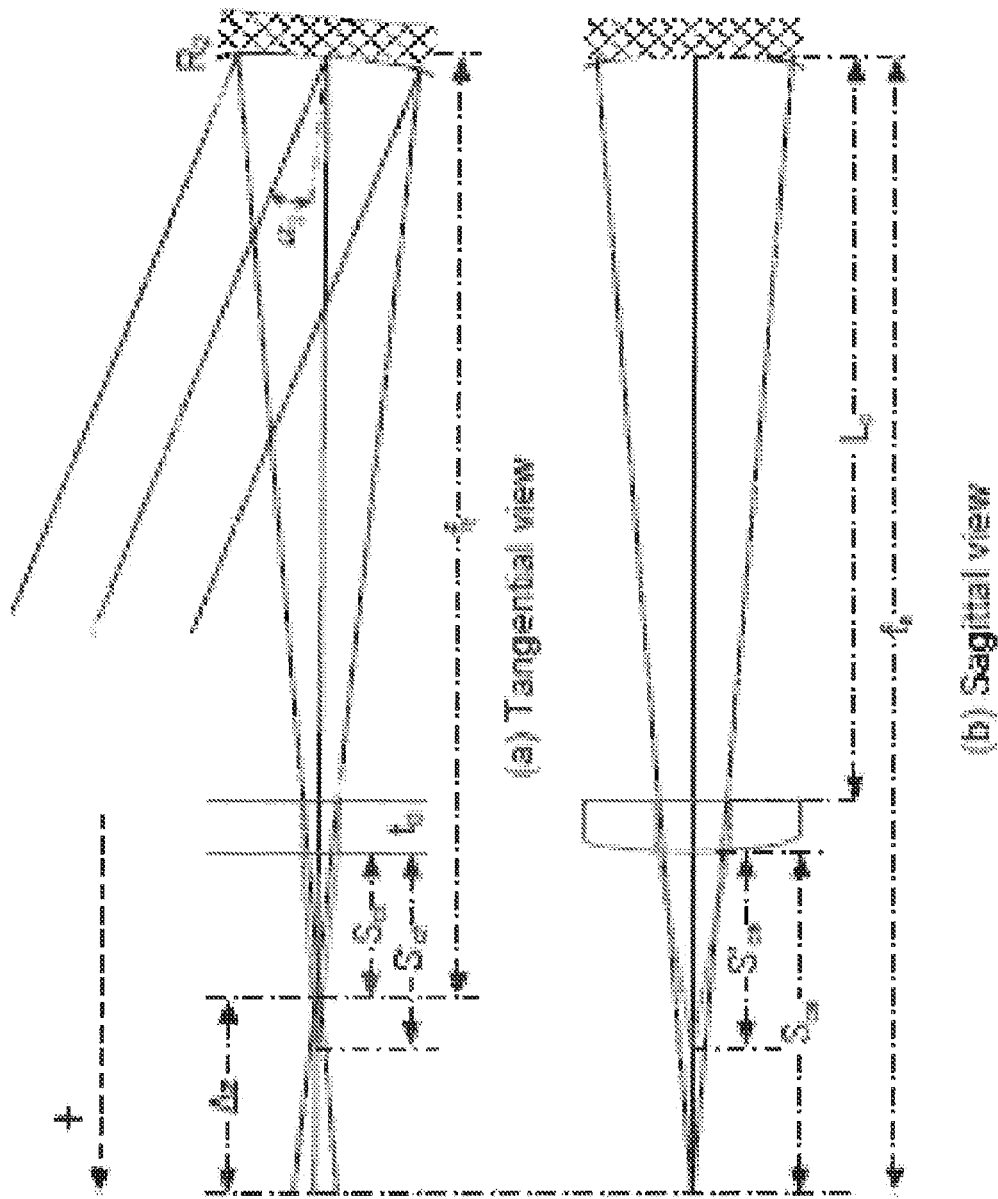
FIG. 6 schematically shows the astigmatism correction by a cylindrical lens in (a) tangential view (b) sagittal view after the second mirror in a Czerny-Turner spectrometer, according to an illustrative aspect of the invention.

The astigmatism is removed when $$\Delta_z = s_{cs} - s'_{cs} + s'_{ct} - s_{ct}, \quad (6)$$

as illustrated in FIG. 6. Substituting Eq. (4) and Eq. (5) into Eq. (6) gives $$s^2_{cs} - [\Delta_z - ((n-1)/n) t_0] s_{cs} - f_{cs} [\Delta_z - ((n-1)/n) t_0] = 0, s_{cs} \text{ and } f_{cs} > 0. \quad (7)$$

Solving for $s_{cs}$ yields $$s_{cs} = [P + (P^2 + 4 P f_{cs})^{1/2}]/2, \quad (8)$$

where $P = \Delta_z - t_0 (n-1)/n$. The position of the cylindrical lens is then determined as the distance from the second mirror $L_c$ as shown in FIG. 6(b) given by $$L_c = f_s - s_{cs} - t_0, \quad (9)$$

where $f_s = R_2/2 \cos \alpha_2$.

Figure 7:
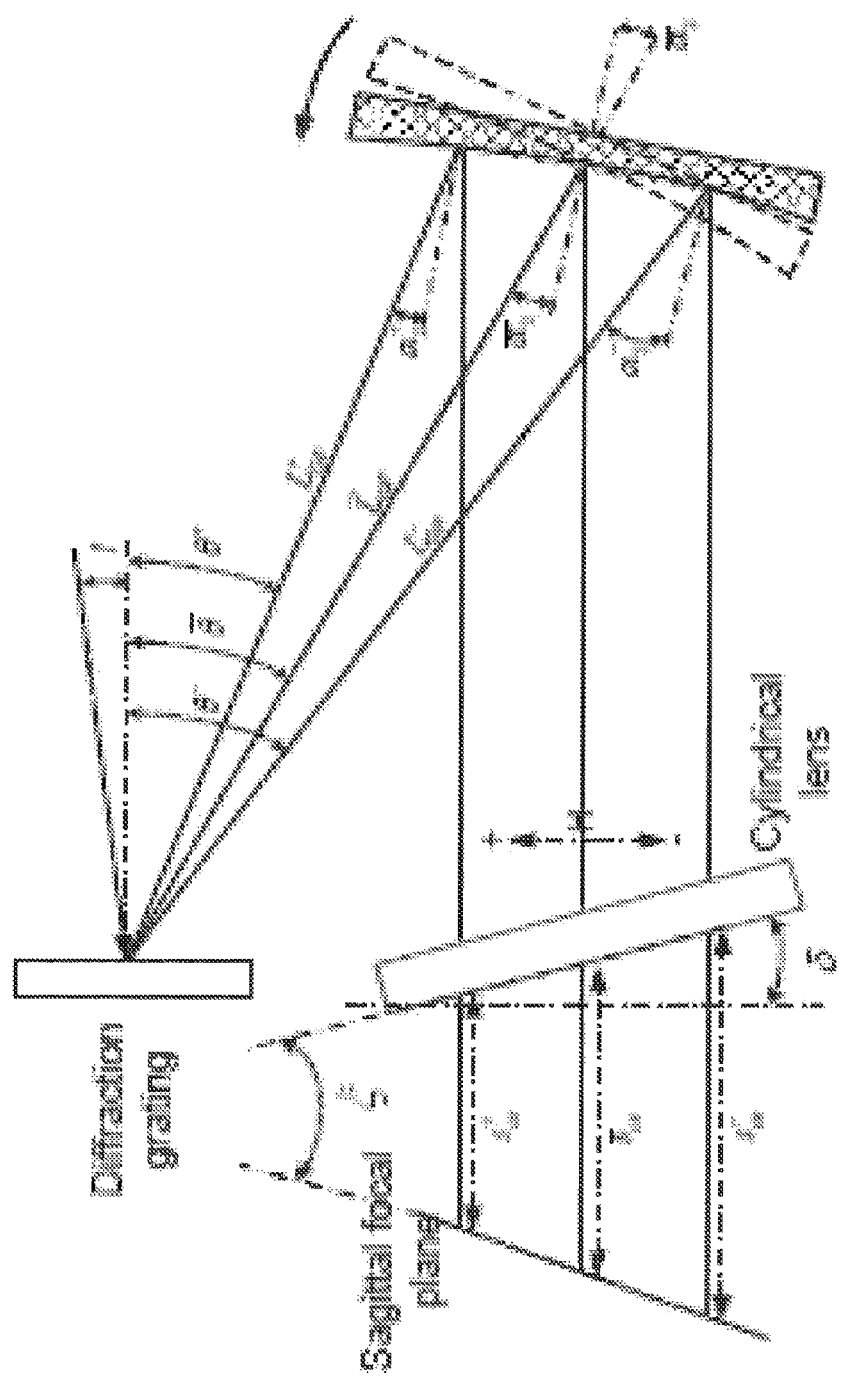
FIG. 7 schematically shows broadband astigmatism correction by a tilted cylindrical lens in the tangential view of chief ray-tracing for the different wavelengths in the part of the spectrometer (i is the incident angle to the grating), according to an illustrative aspect of the invention.

The off-axis angle $\alpha_2$ incident to the second spherical mirror varies according to the diffracted wavelength from the grating as shown in FIG. 7. The variation in $\alpha_2$ across the second mirror results in a variation in astigmatism $\Delta_z$ across the detector. The $\Delta_z$ ascends ($R_2 > L_{GF}$, where $L_{GF}$ is the distance between the grating and the second mirror) or descends ($R_2 < L_{GF}$) when the second mirror is rotated counter clockwise by $\Delta_{2bar}$ from the perpendicular position at the central wavelength $\lambda_{bar}$. The ascending or descending astigmatism can be overall compensated by tilting of the cylindrical lens with an optimized angle. The differentiation $ds_{cs}/d\Delta$ is calculated from Eq. (8) as $$ds_{cs}/d\Delta_i = \frac{1}{2} + [(P + 2 f_{cs})/(2 (P^2 + 4 P f_{cs})^{1/2})]. \quad (10)$$

The tilt angle ξ of the cylindrical lens with respect to the sagittal focal plane is shown in FIG. 7 and can be estimated with the first order polynomial fitting at the center (i.e., H=0) as $$\tan \xi = (ds_{cs}/dH)|_{H=0} (ds_{cs}/d\Delta_z)|_{\Delta_t = \Delta_{tbar}} (d\Delta_z/d\lambda)|_{\lambda = \lambda_{bar}} (d\lambda/dH)|_{H=0}, \quad (11)$$

where $ds_{cs}/d\Delta_z|_{\Delta_t = \Delta_{tbar}}$ is obtained from Eq. (10) as $$(ds_{cs}/d\Delta_z)|_{\Delta_t = \Delta_{tbar}} = \frac{1}{2}[(P_{bar} 2 f_{cs})/(2 (P^2_{bar} + 4 P_{bar} f_{cs})^{1/2})], \quad (12)$$

where $P_{bar} = \Delta_{zbar} - t_0(n-1)/n$ and according to Eq. (3)

$$\Delta_{zbar} = (R_1/2)(\sin \alpha_1 \tan \alpha_1) + (R_2/2)(\sin \alpha_2 \tan \alpha_2). \quad (13)$$

The second term $(d\Delta_z/d\lambda)|_{\lambda=\lambda_{bar}}$ in Eq. (11) is derived as $$\left(\frac{d\Delta_z}{d\lambda}\right)\bigg|_{\lambda=\lambda bar} = \left(\frac{d\Delta_z}{d\alpha_2}\right)\bigg|_{\alpha_2=\alpha_{2bar}} \left(\frac{d\alpha_2}{d\theta}\right)\bigg|_{\theta=\theta bar} \left(\frac{d\theta}{d\lambda}\right)\bigg|_{\lambda=\lambda bar} \quad (14)$$

$$= \left[\left(\frac{R_2}{2}\right)(\sin \alpha_{2bar}(1 + \sec^2 \alpha_{2bar})\right]$$

$$\left[1 - \frac{L_{Gfbar}}{R_2 \cos \alpha_{2bar}}\right]\left[\frac{1}{d \cos \theta_{bar}}\right],$$

where the first bracket on the right side of Eq. (14) is obtained from Eq. (3), the second bracket is derived from geometry, and the third bracket is the angular dispersion of the grating with $\theta_{bar}$ being the diffraction angle at the central wavelength $\lambda_{bar}$, d is the groove spacing of the grating. The last term in Eq. (7) is the reciprocal of the linear dispersion of the grating with the second mirror $R_2$ at the central wavelength, which is given as $$(d\lambda/dH)|_{H=0} = 2d \cos \theta_{bar}/R_2. \quad (15)$$

The tilt angle δ of the cylindrical lens with respect to the plane perpendicular to the optical axis as designated in FIG. 7 can be calculated as $$\delta = \xi - [\tan^{-1}((df_s/dH)|_{fs=fsbar}) + \alpha_{2bar}], \quad (16)$$

where $(df_s/dH)|_{fs=fsbar} = (df_s/d\alpha_2)|_{\alpha_2=\alpha_{2bar}} (d\alpha_2/d\theta)|_{\theta=\theta bar} (d\theta/d\lambda)|_{\lambda=\lambda bar} (d\lambda/dH)|_{H=0}$, given by $(df_s/d\alpha_2)|_{\alpha_2=\alpha_{2bar}} = (R \sin \alpha_{2bar}/2 \cos^2 \alpha_{2 bar})$, while the other three terms are given in Eqs. (14), (15).

The spectrometer performance was evaluated to predict the spectral resolution along the length of the detector and power collection. The spectral resolution is defined as the spectral bandwidth that one pixel subtends. The wavelength distribution detected by one pixel can be derived by the convolution of the pixel and the line spread function (LSF) for each pixel. The pixel represents a rectangular function with 10 μm width and the LSF was computed from the ray tracing software. The pixel function and the LSF are shown as a red dotted line (501) and blue solid line (503) in FIG. 5(b), respectively. The convolution was done with respect to the distance along the pixels and then the corresponding convolution with respect to the wavelength was obtained considering the dispersion of the grating. The result is shown in FIG. 5(c). The spectral resolution was measured using two metrics; the full width at half maximum and second, the 80% dip in the separation of the two convolutions as shown in FIGS. 5(c) and 5(d).

Figure 8:
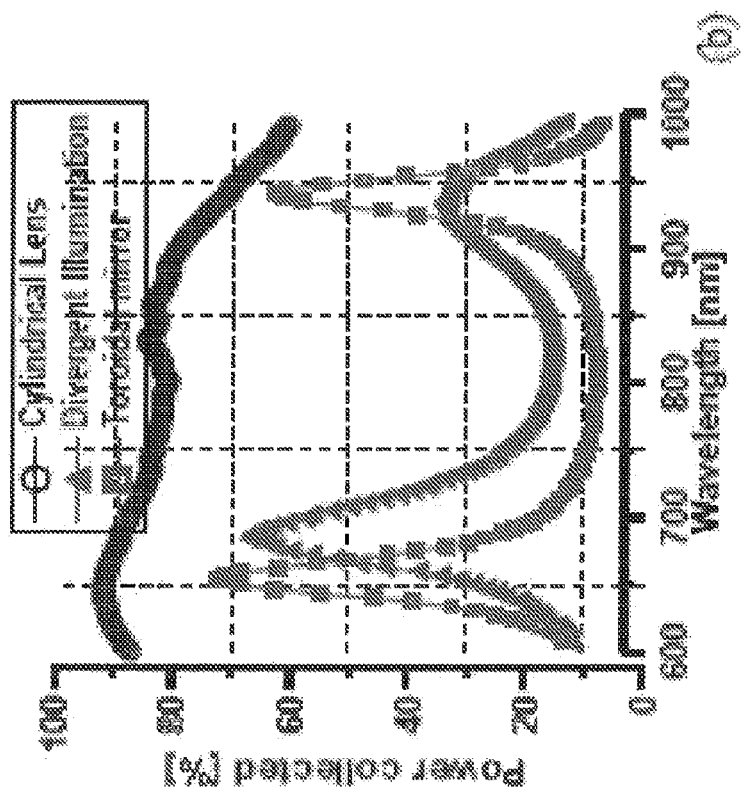
FIG. 8: (a) graphically shows the spectral resolutions over the full bandwidth; (b) power efficiencies collected by the pixel array with 10 μm width for three different methods: the embodied method, a method based on a divergent wavefront, and a method that replaces the spherical mirrors of a traditional Czerny-Turner with toroidal mirrors.
Figure 8:
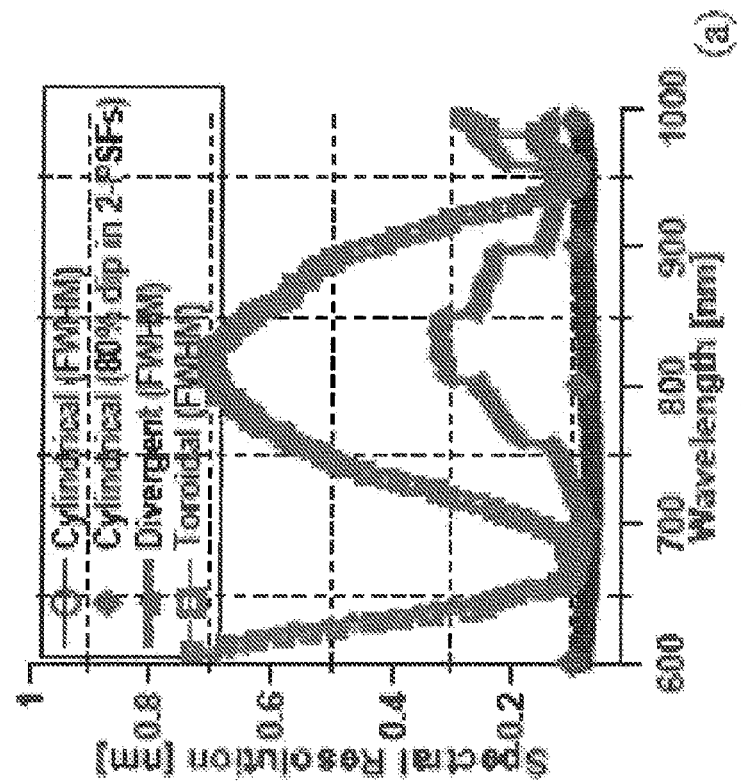

To see how much the performance is improved, we compared the new design with recent attempts at astigmatism management and reduction; specifically with a reported divergent illumination method and a toroidal mirror method, respectively, in the same NA condition and using the detector size (i.e., $NA_i$=0.05, L=80 mm, pixel size 10 μm) and grating dispersion. As seen in FIG. 8, the embodied method is the only one that meets the requirement for the application at hand of 0.1 nm spectral resolution and more than 50% throughput over the bandwidth. The computed spectral resolutions are shown in FIG. 8(a). For the design method, the spectral resolution ranges from 0.07 to 0.09 nm for the FWHM and 0.08 to 0.1 nm for the 80% dip over the full bandwidth as shown in FIG. 8(a). Results demonstrate an improvement of at least three times compared to the other solutions. The power percentages collected by the pixel array with 10 μm width were measured and the results are shown in FIG. 8(b). The throughput collected over the full bandwidth is more than 50% as compared to the other solutions that yield collecting powers of less than 20% over most of the spectrum.

Figure 9:
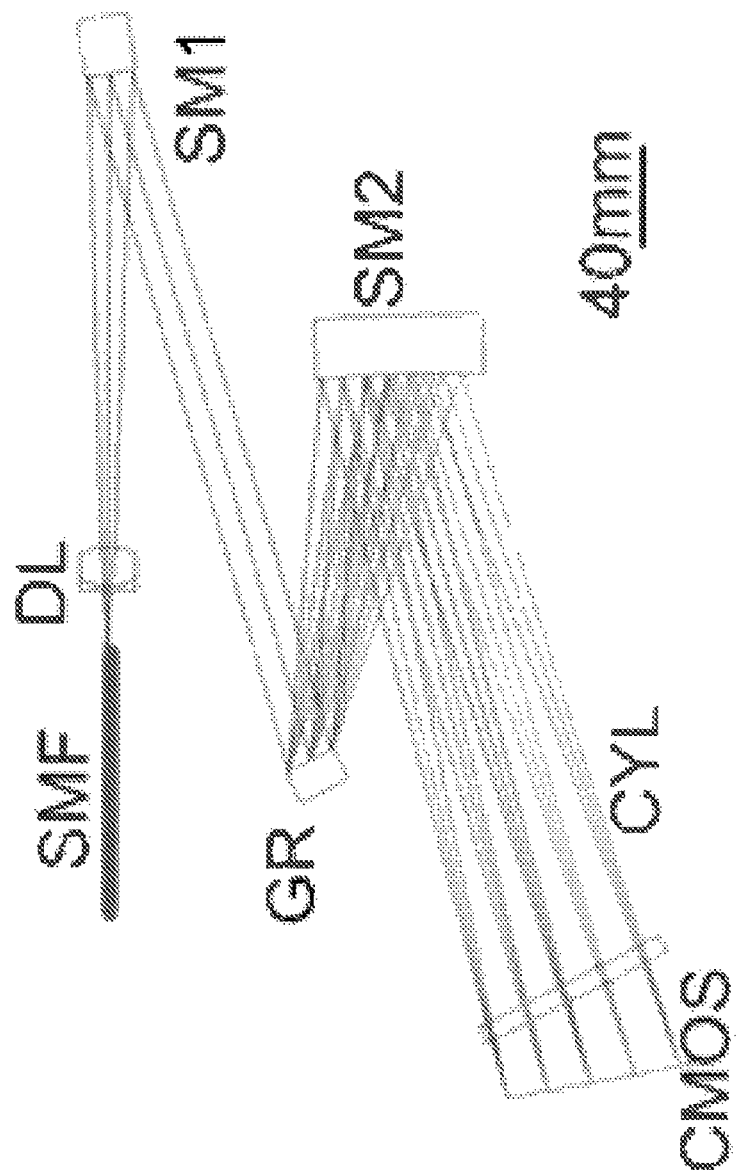
FIG. 9 shows a modified astigmatism-corrected Czerny-Turner spectrometer design. SMF: single mode fiber, DL: doublet lens, SM1: the first spherical mirror, SM2: the second spherical mirror, GR: grating, and CYL: cylindrical lens, according to an exemplary embodiment of the invention.

The above described design is based on an input numerical aperture (NA) 0.04 at 800 nm to the spectrometer, for example, using a photonic crystal fiber (PCF). However, by adding a chromatic lens after the input and before the first spherical mirror, the spectrometer could be adapted to various inputs with different NAs such as single mode fibers (typical NA: 0.1), multimode fibers (typical NA: 0.2), slits or pinholes with various thickness or hole sizes for free space. For example, a single mode fiber (SMF, NA of 0.1 for 800 nm) can be used to allow incorporating a single mode fiber-based interferometer into the overall OCM system. As shown in FIG. 9, we modified the input portion in the original spectrometer design to match the NA of the SMF to the NA of the spectrometer. The matching was achieved by locating a doublet lens (DL) properly between the single mode fiber output and the first spherical mirror (SM1).

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of retelling individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. No language in the specification should be construed as indicating any non-claimed element as essential to the practice of the invention.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A Czerny-Turner-type spectrometer, comprising: a first spherical mirror disposed along an optical path in an off-axis (tilted) orientation;
a plane diffraction grating disposed along the optical axis in a location optically downstream from the first mirror; a second spherical mirror disposed along the optical path in an off-axis orientation in a location optically downstream from the diffraction grating; a cylindrical optic disposed in the optical path in an off-axis (tilted) orientation, wherein the cylindrical optic is disposed in a location between the first spherical mirror and the diffraction grating; and a detector disposed in the optical path a location optically downstream from the second spherical mirror.

2. The spectrometer of claim 1, wherein the cylindrical optic is a lens.

3. The spectrometer of claim 1, wherein the cylindrical optic is disposed in a location optically downstream from the second spherical mirror.

4. The spectrometer of claim 1, wherein the spectrometer has a spectral resolving power characterized by a spectral resolution of equal to or less than 0.1 nanometer (nm) over a spectral region from about 600 nm to about 1000 nm.

5. The spectrometer of claim 4, wherein the spectrometer has a spectral throughput characterized by the spectral resolution of equal to or greater than 50% over the spectral region.

6. The spectrometer of claim 1, further comprising a single mode fiber input and a chromatic lens disposed intermediate the single mode fiber input and the first spherical mirror.

7. The spectrometer of claim 1, further comprising a photonic crystal fiber input disposed optically upstream of the first spherical mirror.

8. A Czerny-Turner component of a Czerny-Turner-type spectrometer, consisting of: a first spherical mirror disposed along an optical path in an off-axis orientation; a plane diffraction grating disposed along the optical axis in a location optically downstream from the first mirror; a second spherical mirror disposed along the optical path in an off-axis orientation in a location optically downstream from the diffraction grating; a cylindrical optic disposed in the optical path in an off-axis (tilted) orientation, wherein the cylindrical optic is disposed in a location between the first spherical mirror and the diffraction grating; a and a detector disposed in the optical path a location optically downstream from the second spherical mirror.

9. The component of claim 8, further consisting of a detector disposed in the optical path in a location optically downstream from the second spherical mirror.

10. The component of claim 8, wherein the cylindrical optic is a lens.

11. The component of claim 8, wherein the cylindrical optic is disposed in a location optically downstream from the second spherical mirror.

12. The component of claim 8, further consisting of a single mode fiber input and a chromatic lens disposed intermediate the single mode fiber input and the first spherical mirror.

13. The component of claim 8, further consisting of a photonic crystal fiber input disposed optically upstream of the first spherical mirror.

* * * * *